United States Patent [19]

Twogood et al.

[11] Patent Number: 4,707,900

[45] Date of Patent: Nov. 24, 1987

[54] CYLINDER LINER SLEEVE PULLER

[75] Inventors: Rodney L. Twogood, Alliance; Raymond L. Wright, Hemingford; Roger D. Rawle, Alliance, all of Nebr.

[73] Assignee: Burlington Northern Railroad Co., Denver, Colo.

[21] Appl. No.: 916,830

[22] Filed: Oct. 9, 1986

[51] Int. Cl.[4] .............................................. B23P 19/04

[52] U.S. Cl. ........................................ 29/244; 29/252; 29/255; 29/282; 29/283; 81/454; 81/461

[58] Field of Search .............. 29/700, 156.4 WL, 244, 29/252, 255, 258, 259, 260, 261, 262, 263, 264, 270, 282, 283; 81/3.05, 53.2, 443, 444, 446, 442, 450, 454, 461

[56] References Cited

U.S. PATENT DOCUMENTS

| | | | |
|---|---|---|---|
| 2,421,324 | 5/1947 | Graham | 29/283 |
| 2,430,201 | 11/1944 | Wyscaver | 29/252 |
| 2,566,847 | 6/1949 | Miller | 29/252 |
| 2,706,849 | 4/1955 | Miller | 29/283 X |
| 2,715,261 | 8/1955 | Williams | 29/252 |
| 2,889,617 | 6/1959 | Mitcham | 29/283 |
| 2,890,520 | 6/1959 | Ford | 29/283 X |
| 3,087,236 | 4/1963 | Paytas | 29/283 X |
| 3,685,132 | 8/1972 | Hodge | 29/280 X |
| 3,808,666 | 4/1974 | Bales, Sr. | 29/252 |
| 3,880,604 | 4/1975 | Hawkins | 29/283 X |

*Primary Examiner*—Howard N. Goldberg
*Assistant Examiner*—Ronald S. Wallace
*Attorney, Agent, or Firm*—Fields, Lewis, Pittenger & Rost

[57] ABSTRACT

A cylinder liner sleeve puller has four legs having flanged feet at their bottom and being connected by four pivotably mounted pivot arms. The arms are pivotably connected to a central hub, which arrangement forces the lower ends of the legs outward when the hub is manually moved downward. In operation, the legs are inserted into the cylinder so that their bottom extremities are below the lower end of the liner sleeve. The hub is then pressed downward, forcing the lower ends of the legs outward until the flanged feet are directly below the liner sleeve. A jack support plate having spaced holes for the legs is then passed over the legs and rests on the engine block. A hydraulic jack is placed on the support plate, and a top plate is fastened to the top of the legs. When the jack is activated, the plunger pushes the top plate upward, causing a corresponding upward movement of the legs, thereby removing the liner sleeve. In one embodiment, an elastic band encircles the legs at a level below the pivot arms, providing added stability in operation.

5 Claims, 4 Drawing Figures

CYLINDER LINER SLEEVE PULLER

TECHNICAL FIELD

The present invention relates to a cylinder liner sleeve puller and more particularly to a hydraulically driven cylinder sleeve puller for removing sleeves from the cylinders of internal combustion engines.

BACKGROUND ART

Modern internal combustion engines, whether of the gasoline or diesel type, are constructed with cylinders having liners or sleeves of a material differing from that of which the cylinder blocks are constructed. These sleeves are usually of hard, wear-resistant steels, but nonetheless require frequent replacement. The sleeves are press-fitted into the cylinders, and a considerable force is required to remove them. Various hydraulic tools have been designed for this purpose. Many of these devices have consisted of stationary equipment, or minimally portable, cumbersome equipment. A constant problem with these tools has been the question of how most effectively and most efficiently to "hook" the sleeve in order to allow the tool to pull it out of the cylinder. Several different approaches have been used, with varying results. U.S. Pat. No. 2,715,261 to Williams depicts the use of an adjustable lock plate to position shoulders under the edges of a liner sleeve. U.S. Pat. No. 2,566,847 to Miller provides an apparatus having legs separated by an adjustable lock plate. A device using a flanged disc is shown in U.S. Pat. No, 2,430,201 to Wyscaver, while U.S. Pat. No. 3,808,666 to Bales shows a reversible dome suitable for both inserting and removing a sleeve. A recurring problem with these approaches has been the need for sets of parts designed to adapt the tool to cylinders of various sizes. In addition, insertion of the tool into the cylinder and engaging the liner sleeve can be difficult and time-consuming.

DISCLOSURE OF THE INVENTION

The cylinder liner sleeve puller of the present invention includes four legs, each having a flanged foot at its lower end for engaging the cylinder liner sleeve. The top portions of the legs are threaded for removable attachment to a top plate. In the fully assembled state of the apparatus, a support plate rests on the cylinder block, with the legs passing through spaced holes around the periphery of said support plate. Advantageously, a circular bottom plate having holes around its periphery through which the legs are passed gives added support to the legs in operation. Both the top plate and the support plate are removed during insertion of the apparatus into the cylinder, thus facilitating the insertion. Pivot arms are pivotably mounted to each leg and are centrally connected between the legs at a pivot arm hub. The pivot arm hub has a handle for manually moving the hub upward and downward. Additionally, an elastic band may be provided which encircles the legs below the level of the pivot arms, thus adding stability to the movement of the legs. To insert the apparatus for operation, the top plate and the support plate are first removed and the legs are inserted into the cylinder until the flanged feet are below the cylinder liner sleeve. By then vertically manipulating the pivot arm hub and the apparatus as a whole, the flanged feet are brought into engagement with the under side of the liner sleeve, and the removal operation may begin. This is easily and quickly accomplished and requires no additional parts to compensate for changes in cylinder size. To remove the liner sleeve, the support plate and the top plate are placed in their assembled positions. A hydraulic jack is then placed on the support plate so that when extended, the jack piston abuts the top plate and pushes it upward. This upward movement of the top plate moves the legs upward, thereby removing the liner sleeve.

Additional advantages of this invention will become apparent from the description which follows, together with the accompanying drawings.

BEST MODE FOR CARRYING OUT THE INVENTION

Figure 1:
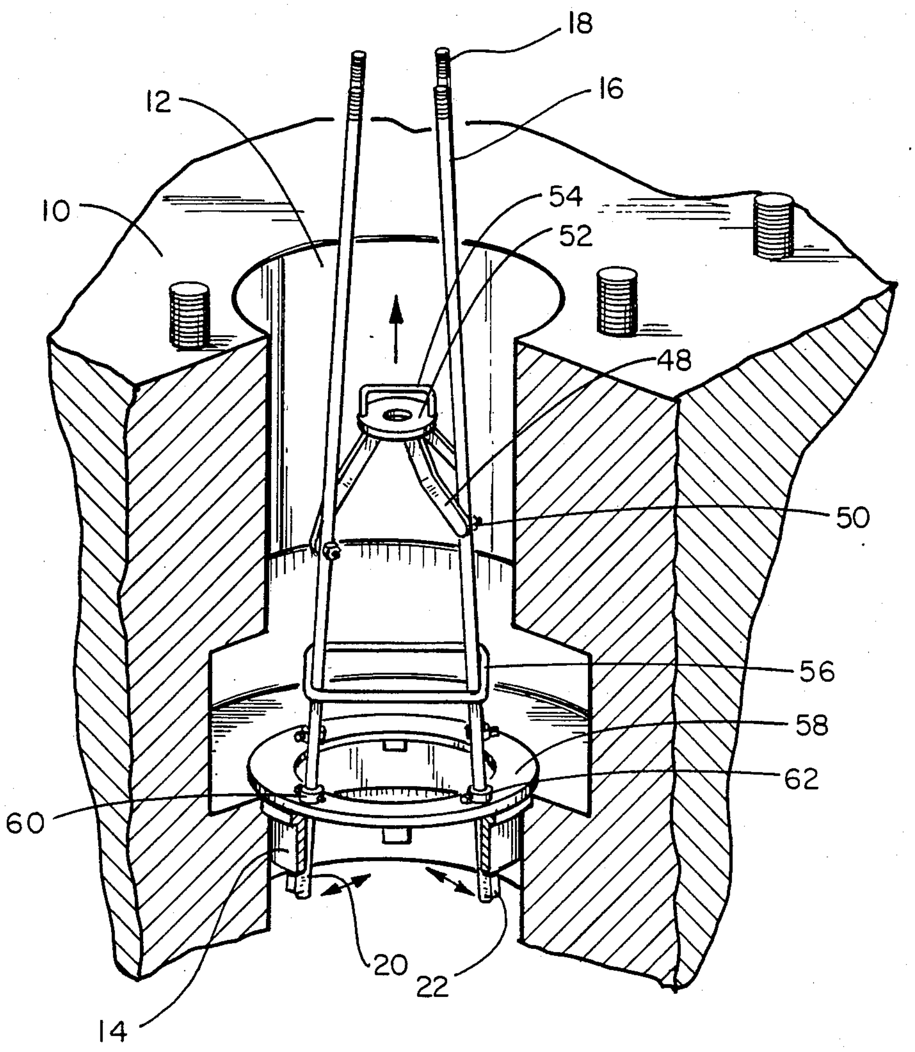
FIG. 1 is a cut-away view of a motor block of an engine with the sleeve puller inserted with the top plate, jack, and support plate removed.

Referring now to FIGS. 1 through 4, there is shown a cylinder block 10 having a cylinder 12 with a cylinder liner sleeve 14 near its bottom. The four legs 16 of the apparatus A each have a threaded top portion 18 and a bottom portion 20 having flanged feet 22 extending outward for engaging the liner sleeve 14. A top plate 24 having four spaced holes 25 through which legs 16 may be passed is fastened to legs 16 by nuts 26. An optional handle 28 may be provided on the top plate 24 for ease of handling. A jack support plate 30 having spaced slots 32 through which pass the legs 16 is positioned to rest on the cylinder block 10. A hydraulic jack 34 includes a base portion 36 and a plunger 38 having a head 40. The jack 34 rests on jack support plate 30, and is preferably surrounded and supported at its base 36 by a jack support bracket 42. A standard hydraulic pump 44 is connected to hydraulic jack 34 by means of hydraulic line 45 coupled to coupling valve 46. Four pivot arms 48 are each pivotably connected to a leg 16 by leg mounting nuts 50. The pivot arms 48 are pivotably joined to pivot arm hub 52 by hub mounting nuts 53. Pivot arm hub 52 is centrally located between the legs and beneath the support plate, and has hub handle 54 for manual manipulation in a vertical direction. Optional elastic band 56 encircles the legs 16 at a level preferably below the pivot arms 48. Circular bottom plate 58 may be provided near the bottom of the legs 16. Legs 16 pass through spaced holes 60 in bottom plate 58, and are pivotably secured in place by lock nuts 62.

Figure 2:
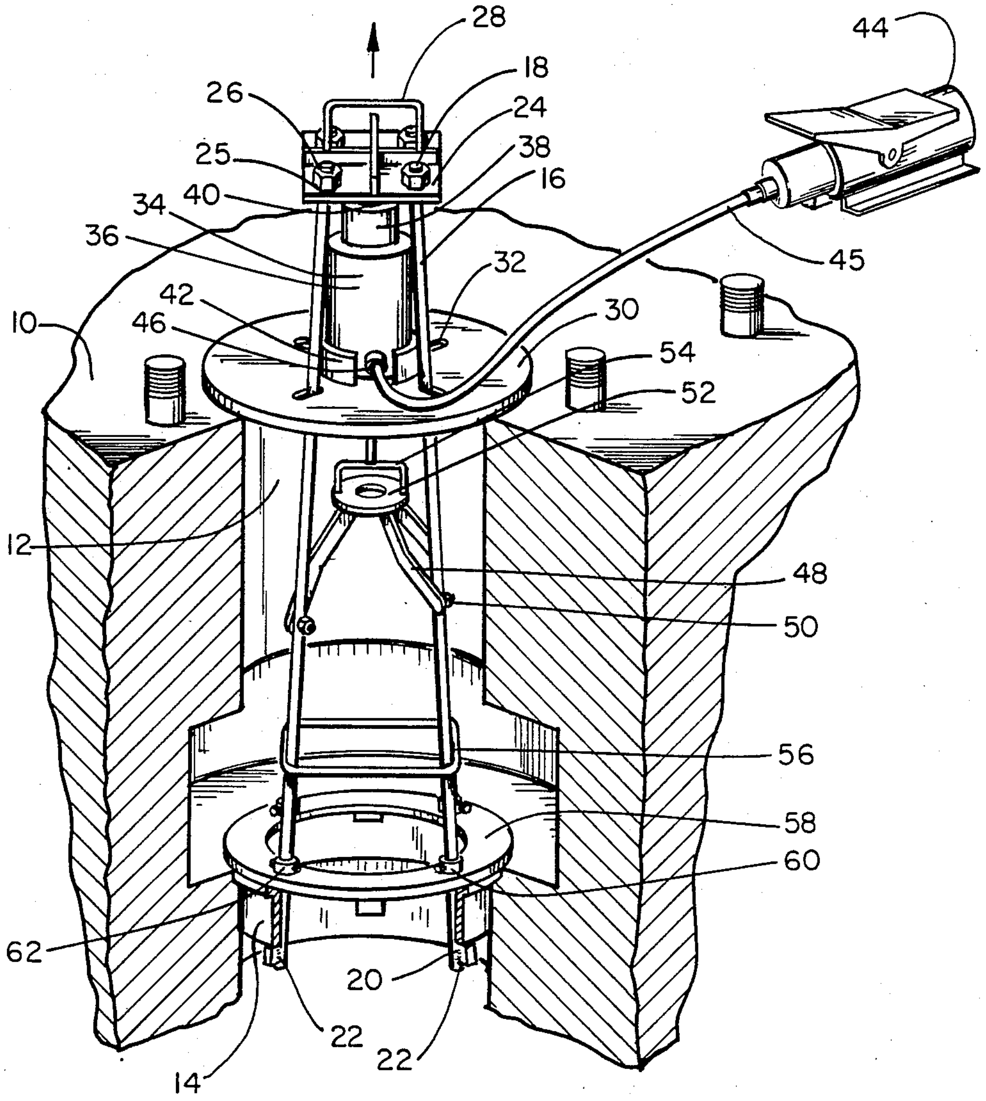
FIG. 2 is a cut-away view of the motor block with the sleeve puller in the operative position and ready to remove the sleeve.
Figure 3:
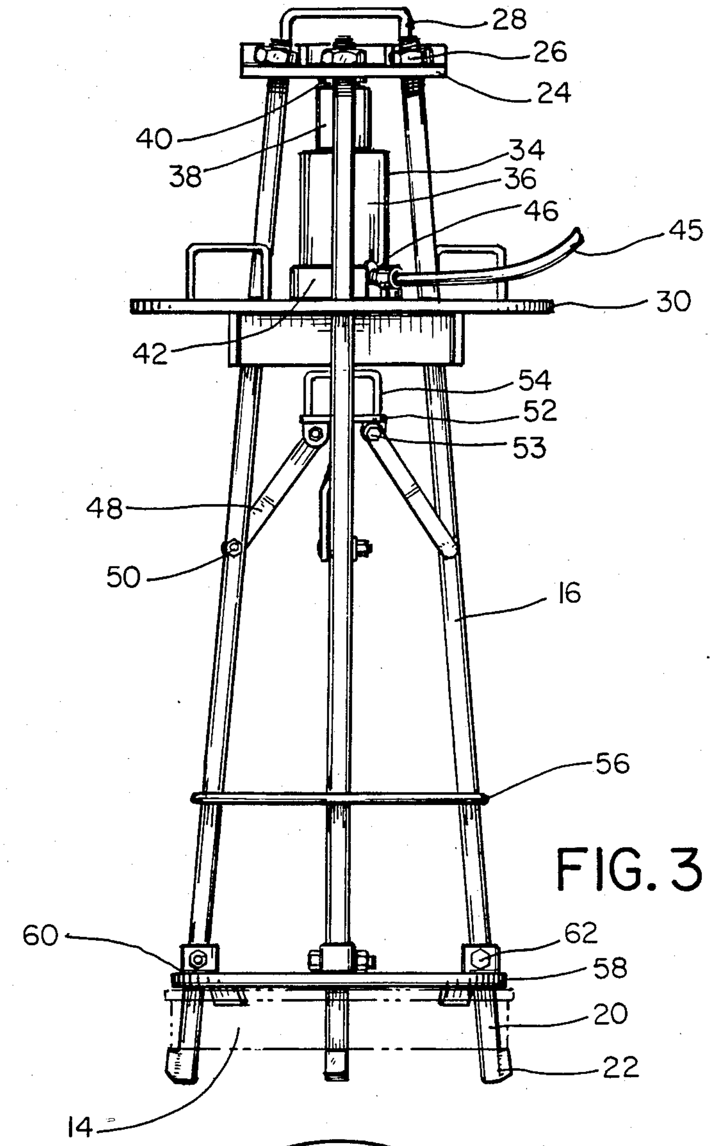
FIG. 3 is a front elevational view of the sleeve puller with the sleeve shown in outline.
Figure 4:
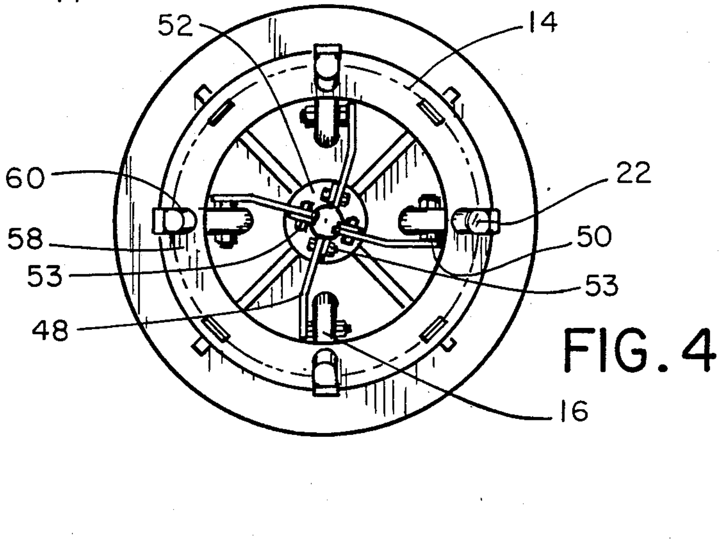
FIG. 4 is a bottom view of the sleeve puller with the sleeve shown in outline.

In operation, insertion of the apparatus A and engagement of the liner sleeve 14 are accomplished simply and quickly by a minimum of manual steps. The top plate 24, hydraulic jack 34, and jack support plate 30 are initially removed from the apparatus A, as shown in FIG. 1. The apparatus A is next inserted downward into the cylinder 12 until the flanged feet 22 are below cylinder liner sleeve 14. The pivot arm hub 52 is then manually pushed downward, thereby forcing the flanged feet 22 outward underneath the liner sleeve 14. By raising the entire apparatus while keeping the feet 22 extended outward underneath the liner sleeve 14, the flanged feet 22 will be brought into contact with the underside of the liner sleeve 14. The support plate 30, jack 34, and top plate 24 are then placed back in position, as best shown in FIG. 2. At this point, insertion of the apparatus A and engagement of the liner sleeve 14 is fully completed, and the operation continues with the removal steps. The hydraulic pump 44 is then connected to the jack 34 through pump line 45 and valve 46. Hydraulic pressure from the pump 44 is then used to force extension of the plunger 38. As the plunger 38 extends, plunger head 40 presses against top plate 24, forcing it to move upward. This upward motion of the top plate 24 causes the legs 16 to move upward, thus also moving the liner sleeve 14 upward. After a short upward movement, the liner sleeve 14 will be in a position where removal may be completed manually.

From the foregoing, the advantages of this invention are readily apparent. A cylinder liner sleeve puller has been provided which may be easily and quickly inserted into the cylinder and prepared for removal of the liner sleeve. Further, no additional parts are required to adapt the apparatus to cylinders of different sizes, as the apparatus may be easily and quickly adjusted to securely fit a wide range of cylinder sizes.

We claim:

1. A cylinder liner sleeve puller driven by a hydraulic jack having an extended and a retracted position, said sleeve puller comprising:

a plurality of legs each having a top portion and a bottom portion;

outwardly facing flanged feet on the bottom portion of said legs for engaging said cylinder liner sleeve;

a top plate;

fastening means for removably fastening the top portions of said legs to said top plate;

a removable support plate located below said top plate and having spaced holes through which said legs pass, said support plate having a larger diameter than said cylinder;

a plurality of pivot arms each pivotably mounted to one of said legs;

a pivot arm hub centrally located between said legs and having said pivot arms pivotably mounted thereto; and handle means for vertically moving said pivot plate, thereby moving said legs inwardly and outwardly.

2. A cylinder liner sleeve puller as claimed in claim 1, further comprising:

an elastic band encompassing all of said legs, said band being located between said pivot arms and said end portions of said legs.

3. A cylinder liner sleeve puller as claimed in claim 1, further comprising:

a circular bottom plate of substantially the same diameter as the cylinder, said plate having spaced holes through which said legs pass and resting on the top of said liner sleeve when said sleeve puller engages said liner sleeve.

4. A cylinder liner sleeve puller comprising:

a plurality of legs each having a top portion and a bottom portion;

outwardly facing flanged feet on the bottom portion of said legs for engaging said cylinder liner sleeve;

a top plate;

fastening means for removably fastening the top portions of said legs to said top plate;

a removable support plate located below said top plate and having spaced holes through which said legs pass, said support plate having a larger diameter than said cylinder;

a plurality of pivot arms each pivotably mounted to one of said legs;

a pivot arm hub centrally located between said legs and having said pivot arms pivotably mounted thereto;

handle means for vertically moving said pivot plate, thereby moving said legs inwardly and outwardly; and a hydraulic jack having an extended and a retracted position and being removably mounted between said support plate and said top plate, such that when said jack is moved from the retracted to the extended position, said top plate moves upward and said legs draw said liner sleeve from said cylinder.

5. A cylinder liner sleeve puller as claimed in claim 4, further comprising:

a jack support bracket located on the top surface of said support plate, said bracket comforming to the shape of the base of said hydraulic jack and having internal dimensions larger than the corresponding external dimensions of said jack.

* * * * *